United States Patent [19]

Quadflieg et al.

[11] Patent Number: 5,145,710
[45] Date of Patent: Sep. 8, 1992

[54] METHOD AND APPARATUS FOR APPLYING A METALLIC COATING TO THREADED END SECTIONS OF PLASTIC PIPES AND RESULTING PIPE

[75] Inventors: Erich Quadflieg, Krefeld; Heestermans, Martinus C. J., RA Zwolle, Netherlands

[73] Assignee: Mannesmann Aktiengesellschaft Wavin B.V., Düsseldorf, Fed. Rep. of Germany

[21] Appl. No.: 613,392

[22] Filed: Nov. 15, 1990

[30] Foreign Application Priority Data

Nov. 16, 1989 [DE] Fed. Rep. of Germany ....... 3938362
Nov. 16, 1989 [NL] Netherlands ............... 8902840

[51] Int. Cl.⁵ .................... B05D 1/00; B05D 1/08
[52] U.S. Cl. .............................. 427/34; 427/37; 427/256; 427/284; 427/423; 427/425; 427/427
[58] Field of Search .............. 427/425, 422, 34, 423, 427/437, 37, 284, 256

[56] References Cited

U.S. PATENT DOCUMENTS

| | | | |
|---|---|---|---|
| 3,019,014 | 1/1962 | Miksis | 427/425 |
| 4,397,893 | 8/1983 | Bottoms | 427/425 |
| 4,464,414 | 8/1984 | Milewski et al. | 427/425 |
| 5,019,429 | 5/1991 | Moskowitz et al. | 427/423 |
| 5,069,761 | 12/1991 | Krings et al. | 427/239 |

Primary Examiner—Janyce Bell
Attorney, Agent, or Firm—Cohen, Pontani, Lieberman & Pavane

[57] ABSTRACT

A metallic coating is applied to threaded sections on the ends of plastic pipes that are to be forcefully screwed together. Droplets of a metal or metallic alloy are sprayed against the threaded sections at a high velocity, at a selectable angle of impingement, and within a zone of impingement. During the spraying, the pipe is turned and also moved relative to the zone of impingement in a longitudinal direction of the pipe. The resulting metallic coating on the pipes, beneficially, is porous so that such coating may contain lubricant, for instance. The apparatus for carrying out the spraying method includes a rotable pipe-holding device, and an arc metal spray unit having a nozzle whose direction of emission is adjustable.

16 Claims, 1 Drawing Sheet

METHOD AND APPARATUS FOR APPLYING A METALLIC COATING TO THREADED END SECTIONS OF PLASTIC PIPES AND RESULTING PIPE

BACKGROUND OF THE INVENTION

The present invention relates to a method and apparatus for applying a metallic coating to threaded end sections of plastic pipes that can be forcibly screwed to each other.

For several years in the production of petroleum and natural gas, it has been necessary, as the deposits of the easily exploitable fields have been increasingly exhausted, to drill to progressively greater depths. Also fields which were classified as difficult were put into production, in which connection the percentage of strongly corrosive elements in the fluid to be conveyed, such as $CO_2$, $H_2S$ and chlorides, alone and in combination, become increasingly greater. In addition to this, it has also become customary in petroleum production to force salt water, obtained upon the separation of the oil, partially or entirely back into the borehole in order to maintain a necessary reservoir pressure. Pipes made of ordinary carbon steel cannot withstand the resulting massive corrosive attack; there are a large number of proposals for the solution of this problem.

One of the proposals to solve the foregoing corrosion problem is to line the entire inside of a pipe with a corrosion-resistant material, for instance plastic, or to form a pipe from a corrosion resistant high-alloy steel having a high content of chromium, nickel or similar elements. The lining of carbon steel pipes with a so-called in liner of plastic, however, is very difficult. This is since, as a result of the very different coefficients of thermal expansion, it is difficult to clamp the two pipes together; and the ends, flanged in most cases, of the inward-drawn plastic pipes tend to crack upon changing temperature stresses The corrosion-resistant high-alloy steel pipes used as an alternative are very expensive since the pipes have a high alloy content of very expensive elements such as chromium and nickel.

Against this background, the use of pure plastic pipes, in particular fiber-reinforced plastic pipes, has become increasingly interesting since they are considerably cheaper than pipes of high alloy steel and have a high resistance to corrosion by the corrosive fluids that occur upon the production of oil. Since it is customary in the production of petroleum and natural gas to reuse the pipes insofar as possible, their ends are provided with a threaded section so that they can be screwed either directly or via a socket to each other. This manner of connection is used in the same way also in the case of plastic pipes. In this connection it is found that, particularly in the case of fiber-reinforced plastic pipes, screwing is in many cases not possible without damaging the thread. In some cases, even the pipe itself would break. The mechanism of the strong clamping of the two threaded surfaces that are pressed against each other has still not been entirely explained; however, there are many indications that, as a result of the high pressure per unit area in the threads, the bonding forces between the plastic surfaces that rest against each other increase greatly despite the lubricant used The torque required for unscrewing a pipe coupling increases to the same extent, so that, above a critical torque, damage to the threaded section is inevitable.

In order to overcome this problem, it has therefore been proposed (EP 0 292 998) to plate the threaded sections with a layer of metal In this case, in an initial step the threaded section is copper-plated or nickel-plated by a currentless wet process, whereupon a layer of copper or nickel is applied by electroplating. The first layer applied is in most cases very thin, about 0.3 $\mu$, since it merely serves to make the threaded section electrically conductive for the subsequent electroplating. The layer applied by electroplating is within the range of 2 to 5 $\mu$ and up to at most 50 $\mu$, since above that value the adherence of the applied layer decreases considerably.

The method described has the great disadvantage that the plating requires a large amount of time, i.e. on the order of 90 minutes including the necessary preliminary treatment, and is therefore very expensive. Furthermore, the method cannot be introduced directly into the production line due to the long processing time, but must be carried out in a bypass procedure. In view of the increasing importance of protecting the environment, it must furthermore be pointed out that the disposal of the corrosive fluids used for the chemical baths is difficult and also increasingly expensive. Furthermore, a lengthy approval procedure is required for installing such baths, particularly in critical water-catchment regions.

SUMMARY OF THE INVENTION

Accordingly, an object of the present invention is to provide a method of applying a metallic coating to the threaded sections of plastic pipes that are to be forcibly screwed together, which method is faster and cheaper than the abovementioned method, can easily be integrated into a production line, and is advantageous with respect to the protection of the environment.

The foregoing object is achieved by a method of the invention, wherein, instead of using expensive plating, the metallic coating required for reliable screwing and unscrewing of plastic pipes that are forcibly screwed to each other is, instead, sprayed on. In this case, drops of a metal or a metal alloy strike with high speed and at an adjustable angle of impingement and preferably at ambient pressure on the corresponding threaded section, and remain adhered to the surface. As a spray method, one can use either arc metal spraying, which is known per se, or wire-flame spraying, as well as plasma spraying. Upon spraying, the pipe or the bell is turned and the spraying device and the pipe move relative to each other in a longitudinal direction. This means, for instance, that either the spraying device is moved in a longitudinal direction, with the pipe being axially stationary, or the pipe is moved in longitudinal direction with the spraying device being axially stationary. The longitudinal movement extends over at least the length of the threaded section and consists of at least one forward and return travel so that within a very short time of only a few seconds a layer of a thickness of 30 $\mu$ or more can be applied. However, layer thicknesses of up to 100 $\mu$ can also be obtained without great difficultly. The pipe, which rotates during the spraying, rotates at a speed of 200 to 300 rpm, and preferably 250 rpm, the latter value pertaining to a pipe of a diameter of 100 mm. The speed of impingement of the metal droplets on the surface of the plastic pipe can be up to 150 meters per second. These high speeds are necessary in order to cause a sufficient interaction between the impinging droplets and the surface to obtain the required adherence. When using the known arc metal spraying procedure, despite the high temperatures of 3500° to 4500° C., and preferably 4000° C., prevailing in the region of the arc, a merely slight heating of the plastic pipe to at most 35° C. is advantageous. It is furthermore advantageous that upon spraying, aside from a rough cleaning of the mechanically produced threaded section, no prior treatment is required. In the case of bells or pipe ends formed as bell elements, specially designed spray devices are used which, guided centrally, can be pushed into the inside of the bell or pipe end. Since such a device has a given minimum dimension, there is a minimum limitation in dimension for the use of the spray process for bells. On the other hand, a threaded section comprising a spigot can be readily provided with a coating, down to the smallest imaginable dimensions. The angle of impingement is adjustable and, upon the longitudinal movement of the spraying device or the pipe, is adapted to the flank angle of the thread. The direction of impingement preferably forms a right angle with the direction of the flank.

The sprayed metal layer is porous, the layer thickness being preferably within a range of between 30 and 50 μ and being dependent, among other things, on the kind of metal sprayed. Elements or alloys from the group of ductile nonferrous metals, preferably copper, tin or bronze, are sprayed. It has been found advantageous to spray a layer of a nonferrous metal, preferably copper. This is important for the formation of a slide layer which is as smooth as possible, but permeated by pores. Upon forceful screwing, the unordered surface structure of the sprayed layer is flattened and smoothed as a result of the plastic deformation which takes place, the porosity, however, being substantially retained. These remaining pores then form chambers to receive the lubricant used upon screwing. The lubricants generally serve at the same time as a sealing agent so that up to 10 multiple screwings are readily possible. In this regard, the unscrewing torque amounts to only a fraction of that of untreated plastic pipes that are forced-screwed to each other.

Due to the small amount of apparatus necessary, the method can easily be integrated in a pre-existing manufacturing line and, aside from the customary exhaust directly in the region of the spraying, does not require any expense with regard to protection of the environment. The method of the invention can be employed for all kinds of shapes of thread, in which connection, however, for purposes of tightness and load-bearing capacity of the connection, the use of a special thread other than the API standard thread has been found to be particularly advantageous. Shapes of threads which have an abutment shoulder as sealing element are also possible.

BRIEF DESCRIPTION OF THE DRAWING

The invention will be explained below in further detail with reference to the drawing, in which.

DETAILED DESCRIPTION OF THE PREFERRED EMBODIMENTS

Figure 1:
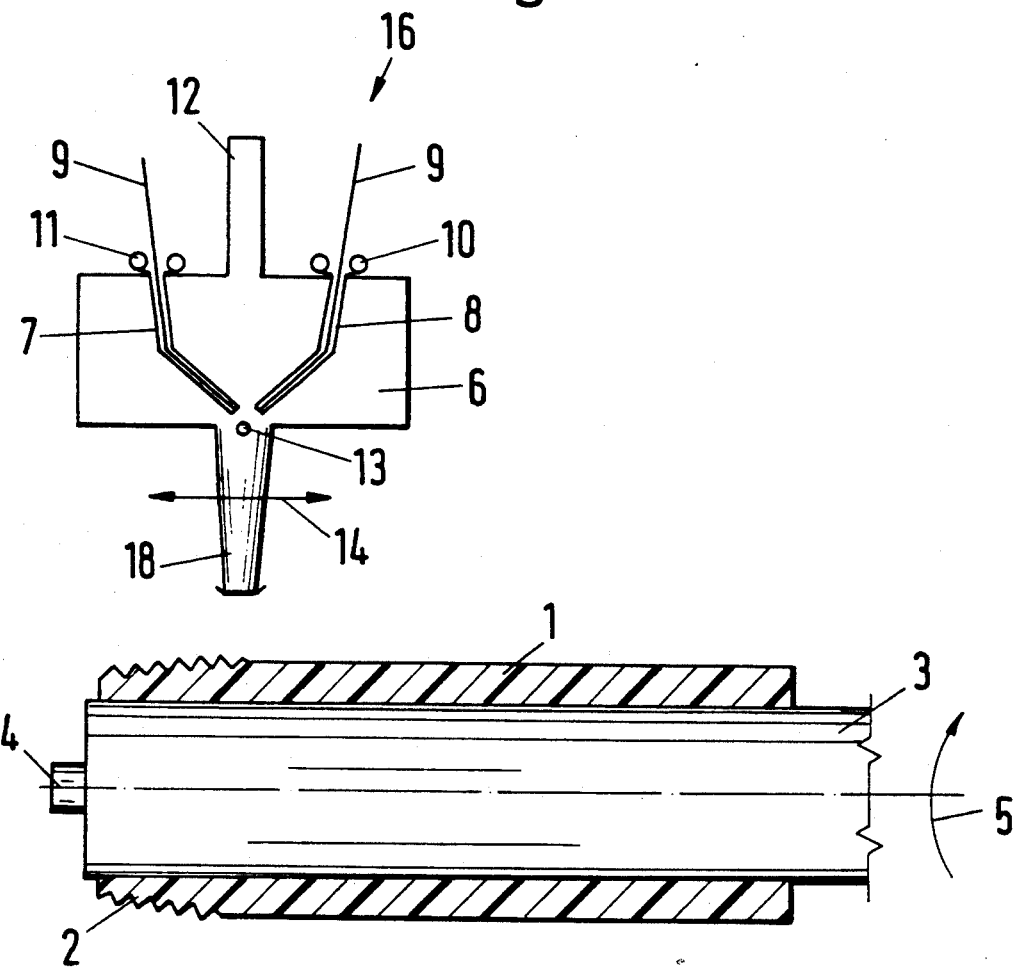
FIG. 1 is a diagrammatic showing of a device operating in accordance with the principle of arc metal spraying.

FIG. 1 shows an apparatus for carrying out the method of the invention, employing in this example the principle of arc metal spraying, which is known per se. A fiber-reinforced plastic pipe 1 is provided on one end with a threaded section 2, on which a metal coating is to be provided. For this purpose, the plastic pipe 1 is placed on a mandrel 3, the pin 4 of which is connected to a drive means, not shown. The rotation of the mandrel 3 together with the plastic pipe placed over it is indicated by the arrow 5.

The spray device 16 of FIG. 1 consists of a spray chamber 6 having two wire guides 7, 8, through each of which a metal wire 9 is conducted into the spray chamber 6 by means of a pair of rollers 10, 11. By applying a suitable electric voltage to the two wire guides 7, 8, an arc is struck between two contacting wires 9 so that a temperature of several thousand degrees is produced in the region of the arc of the two wires 9, whereby the metal or metal alloy is melted. Compressed air is fed to the spray chamber 6 via a connection 12, and the drop 13 which is formed is sprayed with high velocity via a nozzle 18 onto the threaded section 2. Impingement velocities of up to 150 meters per second can be obtained.

During the spraying, the plastic pipe 1 rotates, and, at the same time, the spray device 16 carries out a longitudinal movement, as indicated here by the arrow 14. As an alternative it is also possible for the spray device 16 to be stationary and the plastic pipe 1 to rotate and, at the same time, be moved axially.

Figure 2:
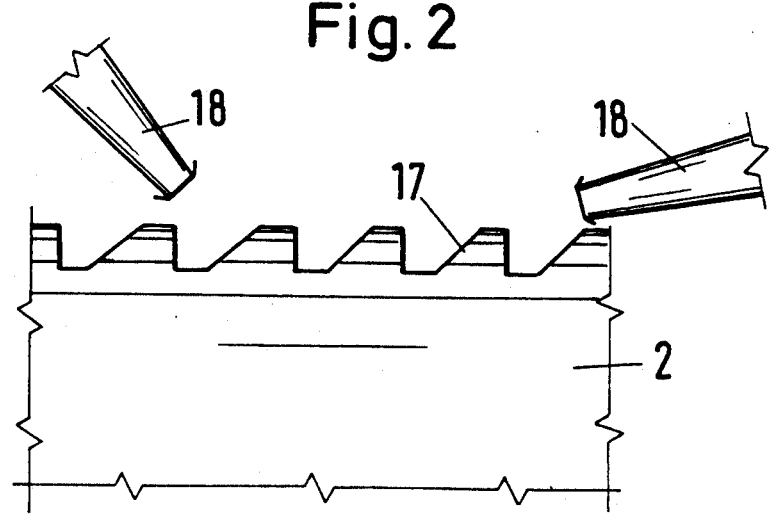
FIG. 2 shows a detail of spraying in the region of a thread.

In order to obtain a sufficient thickness layer on all surfaces of the thread, the impingement angle can be varied by swinging the spray device 16, as shown in FIG. 2. In this connection, it is attempted to obtain a substantially perpendicular angle of the direction of impingement with respect to a main axis of the flank of a thread 17 on the threaded section 2. The distance from the nozzle 18 of the spray device 16 to the surface of the plastic pipe 1 to be coated is adjusted to about 50 mm during the spraying.

All fusible metals and metal alloys can be used as wire 9, pure copper having proven favorable in view of the corrosion problems that occur with the conveying of corrosive fluids. Furthermore, since copper is very ductile, it forms a practically smooth separation layer upon the first forceful screwing; this layer, however, is still sufficiently porous to support the adherence of lubricant. The layer thicknesses of the metallic coating produced are preferably within the range of 30 to 50 μ, a value which is particularly favorable for the required forceful screwing of the plastic pipes to be connected to each other.

It should be understood that the preferred embodiments and examples described are for illustrative purposes only and are not to be construed as limiting the scope of the present invention which is properly delineated only in the appended claims.

We claim:

1. A method of applying a metallic coating to the threaded sections on the ends of plastic pipes that are to be forcefully screwed together, comprising the steps of:
   spraying droplets of one of a metal and metal-alloy against the threaded sections, said spraying being done at a high velocity, at an angle of impingement and within a zone of impingement; and
   during the spraying, turning the pipe and also moving the pipe relative to said zone of impingement along a longitudinal axis of the pipe.

2. The method according to claim 1, wherein the step of moving the pipe relative to the zone of impingement comprises moving a sufficient distance such that an entire threaded section is traversed with sprayed droplets over a path that comprises movement in two directions along the longitudinal axis.

3. The method according to claim 1, wherein the step of spraying comprises arc metal spraying.

4. The method according to claim 1, wherein the step of spraying comprises wire flame spraying.

5. According to claim 1, wherein the step of spraying comprises plasma spraying.

6. The method according to claim 1, wherein the step of spraying comprises one of arc metal spraying, wire flame spraying, and plasma spraying.

7. The method according to claim 6, wherein the step of spraying comprises spraying said droplets at an impingement velocity of about 150 meters per second.

8. The method according to claim 6, wherein the step temperature between about 3500° and 4500° C.

9. The method according to claim 1, wherein the step of spraying comprises adjusting the angle of impingement with respect to the flank of a thread of the threaded section during said longitudinal movement.

10. The method according to claim 9, wherein the step of spraying comprises maintaining the angle of impingement substantially at a right angle to a main axis of the flank.

11. The method according to claim 1, wherein the step of spraying comprises spraying at an atmospheric pressure.

12. The method of claim 1, wherein the pipes comprise fiber-reinforced plastic pipes.

13. The method of claim 1, wherein the threaded end sections of the pipes comprise one of a spigot and a bell part.

14. The method according to claim 1, wherein the coating comprises a ductile nonferrous metal, comprising the further step of stopping the spraying when a porous metallic coating is disposed on the threaded section, with a layer thickness within the range of about 30 to 50 microns.

15. The method according to claim 1, wherein the metal or metal-alloy is selected from the group consisting of copper, tin and bronze.

16. The method according to claim 1, wherein the metal comprises copper.

* * * * *